Figure 1:
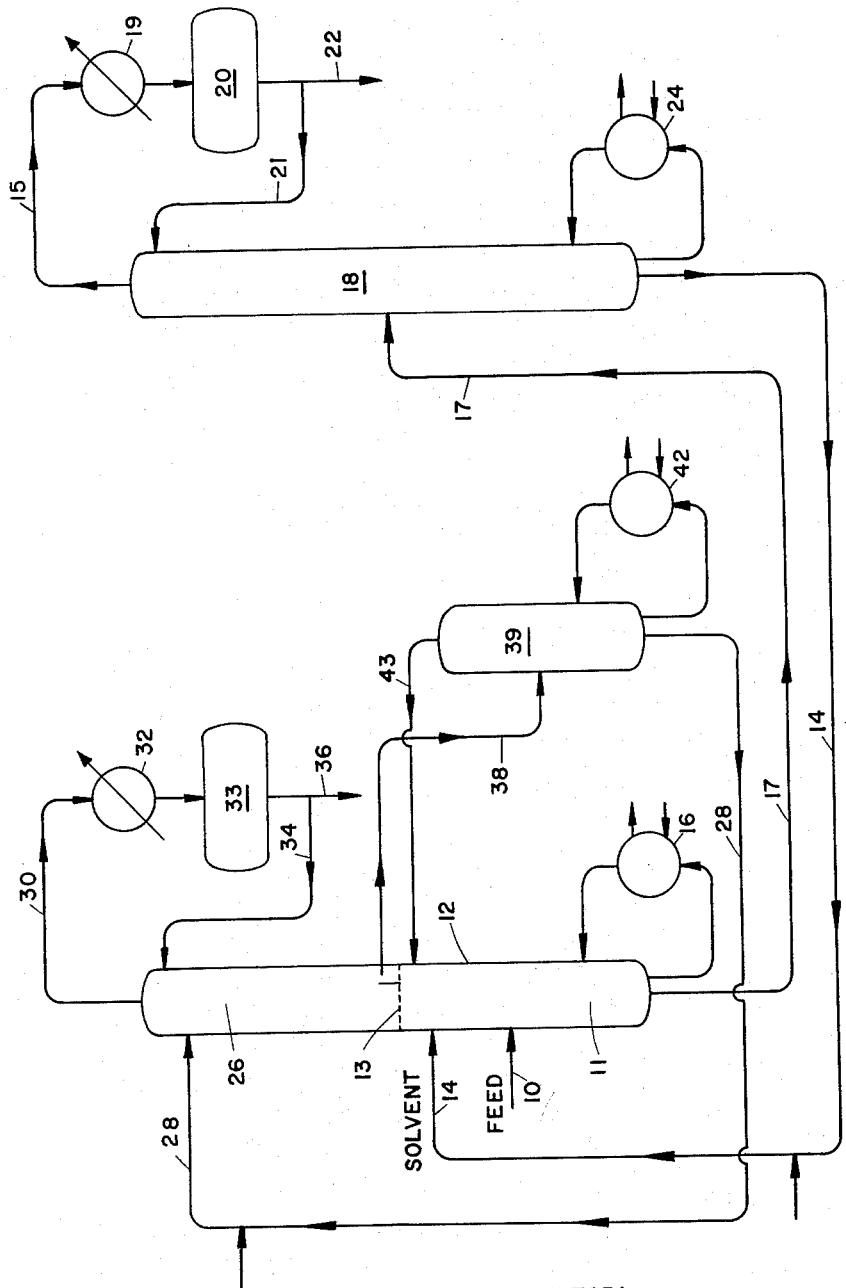

INVENTOR:
CLINE BLACK
BY: J. Reid Anderson
HIS ATTORNEY

2,981,662

EXTRACTIVE DISTILLATION OF AROMATIC COMPOUNDS

Cline Black, Berkeley, Calif., assignor to Shell Oil Company, a corporation of Delaware Filed May 5, 1958, Ser. No. 732,952

3 Claims. (Cl. 202—39.5)

This invention relates to extractive distillation for toluene and xylene recovery from hydrocarbon mixtures, utilizing phenol as the solvent. The process of the invention is particularly suitable for the separation of these materials from close boiling mixtures which contain a material or materials that normally azeotrope with the phenol, thereby resulting in some phenol loss in the raffinate passing overhead from the extractive distillation zone. The improved process of the invention may be operated to reduce significantly or substantially forestall the loss of phenol in the raffinate.

Toluene and the xylenes, chemicals formerly obtained principally from the coal tar industry, have been in recent years recovered in increasingly larger amounts from the petroleum derived streams, such as reformed naphthas. These petroleum streams contain hydrocarbon compounds whose normal volatilities are approximately the same as the aromatic materials being recovered and for this reason the separation of the toluene and the xylenes cannot be satisfactorily achieved through conventional fractional distillation. Hence, it has been necessary to resort to the more costly process of extractive distillation in an attempt to obtain efficient separation of the aromatics from the close boiling components of the hydrocarbon mixtures. Conventionally, toluene is recovered from a $C_7$ mixture and the xylenes are removed from a relatively narrow $C_8$ fraction.

The principal extractive distillation solvent used for the separation of toluene is phenol. Unfortunately it has not been possible generally to operate the extractive distillations without some phenol loss occurring overhead in the raffinate stream. In order to remedy the situation, the raffinate has been passed through a knock-back or rectification section for the purpose of removing the phenol from the raffinate. The knock-back section is normally placed above the extractive distillation zone within the same column. However, even this approach has not proven fully successful since nearly all of the toluene enriched feed streams carry a material or materials which azeotrope with the phenol. For example, $C_7$ feed stocks suitable for toluene extraction inevitably carry some $C_8$ saturated hydrocarbons and if the higher boiling components of these materials are present in any significant amount, the phenol cannot be completely separated from the raffinate stream through simple rectification in the knock-back section. It has been suggested that a better prefractionation to furnish a more narrow cut of the reformed naphtha to the extractive distillation zone, eliminating the higher boiling $C_8$ saturated hydrocarbons, would correct the situation. However, this is not the complete answer, since nearly all of the $C_8$ paraffins with the exception of 2,2,4-trimethyl pentane and n-octane azeotrope with the toluene and hence, prefractionation to remove the $C_8$ without significant loss of toluene is clearly impractical if not impossible. Additionally, it has been generally experienced that the phenol loss is aggravated if the extractive distillation column is operated to obtain a high recovery of toluene. For the foregoing reasons, it has been necessary to compromise between minimum phenol loss and maximum toluene recovery in the operation of toluene extractive distillation systems.

Cresylic acid mixtures have been conventionally used for extracitve distillation of the xylenes from their $C_8$ fractions. Again, as in the instance of the toluene, the material has been chiefly recovered from reformed naphthas, but here prefractionated to obtain a $C_8$ fraction. Phenol provides a higher alpha value for the separation of the $C_8$ saturates from the xylenes in the $C_8$ fraction and for this reason would be a more desirable solvent than the cresylic acid mixture. However, phenol cannot be used because of the prohibitively large phenol loss in the raffinate which loss cannot be reduced to a tolerable proportion, even with the employment of a rectification zone beyond the extractive distillation zone. Since phenol has proven generally unsatisfactory for xylene recovery, it has been the practice in plants recovering both toluene and xylenes to employ separate solvents for these two extractive distillations, usually phenol for the toluene separation and a cresylic acid mixture for the xylene recovery. This need for two different solvents has complicated the use of a single extractive distillation unit for the alternate recovery of xylenes and toluene and also has necessitated the maintenance of two solvent inventories. If the same column is used for both separations, a change of solvents is a practical difficulty encountered each time the separation is changed.

It is an object of the present invention to provide an improved extractive distillation method for the recovery of toluene with a significant reduction or a substantial elimination of the phenol loss. Another object is to provide an improved extractive distillation process permitting the use of phenol as the solvent in the separation of xylenes from a close boiling mixture containing them. Another object is to provide an improved extractive distillation process utilizing phenol as the solvent which permits an economically feasible, high recovery of the toluene. A still further object is to provide a process permitting the use of a most effective single extractive distillation solvent, namely, phenol, for the separation of toluene and the xylene from their respective fractions. Other objects and advantages of the invention will become apparent from the following description taken in conjunction with the accompanying drawings, wherein are set forth by way of illustration and example certain embodiments of this invention.

Figure 2:
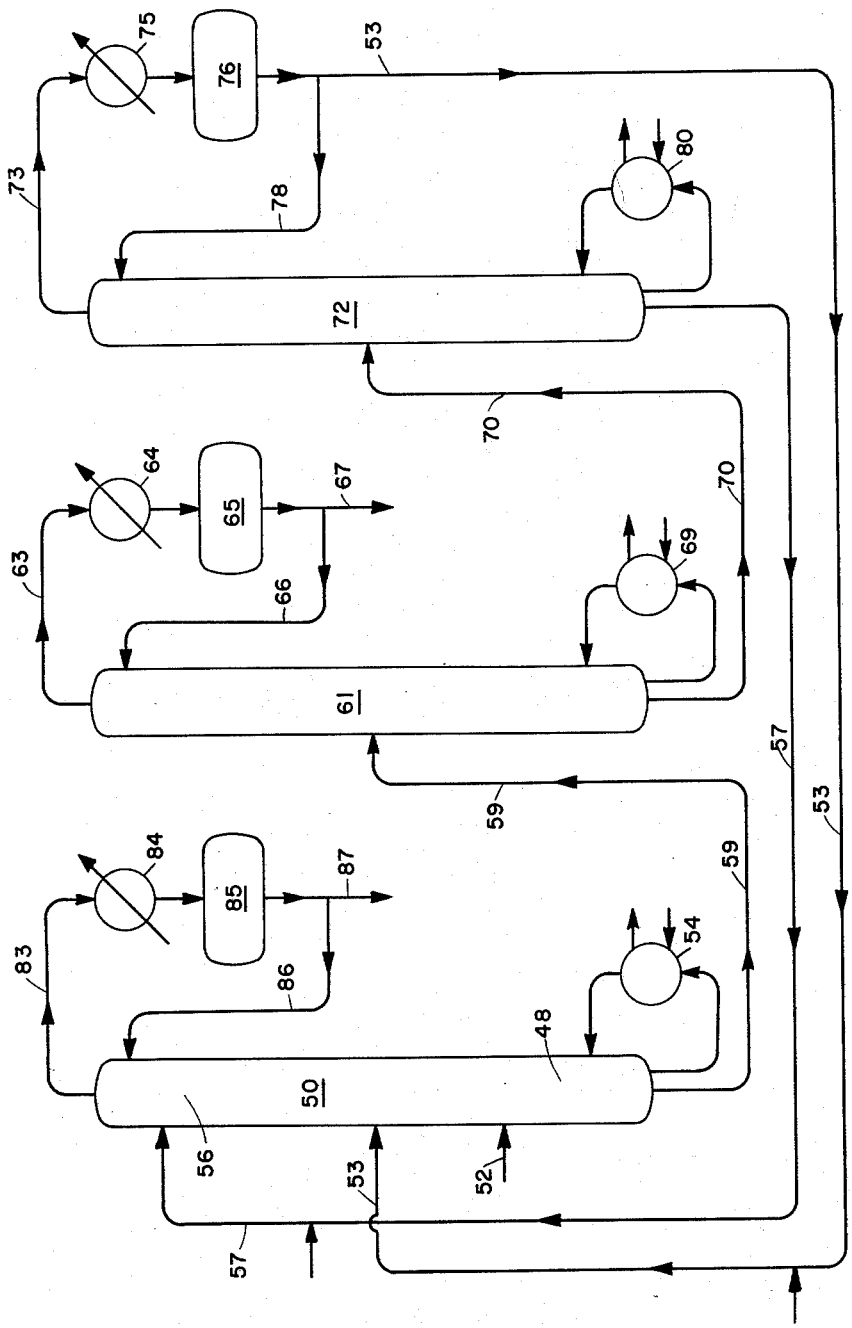

Fig. 1 is a schematic diagram of a preferred system for performing the process; and Fig. 2 is a schematic diagram of an alternative system.

It has now been discovered in an extractive distillation process using phenol as the solvent for the recovery of either toluene or xylenes from hydrocarbon feed mixtures containing compounds which normally azeotrope with the phenol solvent that the loss of the phenol escaping overhead in the raffinate from the process can be appreciably reduced or substantially prevented by directing the raffinate through a rectification zone and within that zone maintaining a high boiling aromatic hydrocarbon material on at least some of the trays in amounts adequate to improve significantly the relative volatility of the phenol and its azeotrope former. The presence of the high boiling aromatic results in a more complete rectification of the phenol and raffinate and permits the withdrawal of the raffinate from the rectification zone with a significantly reduced phenol content relative to that experienced in the absence of the high boiling aromatic. The heavy aromatic hydrocarbon passes downwardly through the rectification zone and is removed from the bottom level thereof. The high boiling aromatic material used as the volatility modifier should have a boiling point of at least 55° F. in excess and preferably 90° F. in excess of the boiling point of the phenol.

In a preferred embodiment of the process, the high boiling aromatic hydrocarbon is introduced to a tray at an upper level of the rectification zone. The high boiling material passes downwardly through the zone with the result the lower trays have maintained on them a liquid that is capable of reducing significantly the volatility of the penol relative to the azeotrope formers of the raffinate. Liquid may be removed from a tray at a lower level of the rectification zone and passed to a fractionating column where the high boiling aromatic is separated from the rest of the liquid and recycled to the tray at the upper level of the rectification zone. The rest of the withdrawn liquid is returned to the process at a point below the point of withdrawal in the instance where a single column houses the rectification and the extractive distillation zones. In an alternative system, the high boiling aromatic material is withdrawn with the solvent extract phase from the bottom of the extractive distillation zone and the high boiling aromatic material is subsequently separated from the solvent and returned to the rectification zone.

Various high boiling aromatic hydrocarbons including diaromatics may be employed. The solvent used for this purpose should be a liquid at the temperature of the operation and have a boiling point at least 55° F. in excess of the boiling point of phenol. A favored material for this use is an aromatic solvent prepared from the extract of a solvent extraction (e.g. an Edeleanu process or other suitable extraction process) of an aromatic containing petroleum fraction to have an initial boiling point more than 55° F. (preferably 90° F.) above that of phenol and preferably to be substantially free of paraffins and naphthenes. In the preparation of the aromatic solvent, the Edeleanu extract, for example, may be distilled to separate the lower boiling materials, and if necessary, subjected to a further extraction to remove the paraffins and naphthenes in the event their concentrations are objectionably large. The aromatic containing petroleum fraction from which the aromatic extract is obtained may be, for example, either a straight run fraction or a reformed fraction, such as a catalytically cracked heavy or light gas oil. In the instance of a straight run fraction, the preferred fractions are either a heavy kerosene or light gas oil. Generally speaking, the aromatic containing petroleum fraction will have a boiling range lying within the temperatures of about 350° F. to 800° F. Other possible solvents include mixtures or essentially pure compounds, such as $C_{12}$ and higher alkyl mono-aromatics and such diaromatics as the lower alkyl naphthalenes, for example, methyl and ethyl naphthalenes, preferably alpha methyl naphthalene. Phenyl naphthalene is also suitable. Specific examples of acceptable mono-aromatics include normal hexyl benzene and alkyl benzene boiling above this, preferably in the boiling range between hexyl and including decyl benzene. Those aromatic materials which are normally solid can be mixed with other suitable liquid high boiling aromatic materials, and in some instances, a normally solid material, e.g. naphthalene itself, can be maintained in a liquid state by employing steam lagged lines. Higher aromatics, e.g. tri- and tetra-aromatics can be used as additions to other suitable solvents. In the instance of an aromatic solvent prepared from the extract of a solvent extraction of a catalytically cracked heavy gas oil, there will be considerable tri-aromatics present.

The high boiling aromatic solvent introduced into the rectification zone may be employed in varying amounts to alter the volatility of the phenol relative to that of the raffinate. Generally speaking, it is recommended that the solvent be used in an amount within the range of about 0.1 and 3.0 volumes per volume of raffinate hydrocarbon. Where toluene is being recovered from an appropriate hydrocarbon fraction in the underlying extractive distillation zone, the amount of the high boiling aromatic solvent admitted to the rectification zone will generally be in the range of 0.1 to 1.0 volume per volume of the raffinate. Where the extractive distillation zone is used to remove xylenes from a close boiling mixture, the quantitiy of high boiling aromatic solvent employed in the rectification zone is preferably considerably larger than that required in toluene recovery and will normally be in the range of about 0.3 to 3.0 volumes per volume of the raffinate. In xylene recovery, the preferred amount of the high boiling aromatic solvent used will depend on the particular nature of that material as well as on the amount of azeotroping material present in the raffinate. Generally speaking, for xylene recovery, it is best to use diaromatics in preference to mono-aromatics of the same carbon number. A particularly suitable volatility modifier for xylene recovery is the Edeleanu extract solvent described previously.

Packed towers employing Raschig rings and other types of packings may be used for the tray column. However, packed columns are not widely used in the industry principally because of the tendency for the liquid to channel and drain down along the walls rather than through the packing. The terms tray or plate column or zone are used generically herein to include packed towers.

The process of the invention may be used to recover toluene from various sources including relatively wide spectrum feeds and prefractionated feed stocks of a limited hydrocarbon range. Preferably, the feed stock is a prefractionated reformed naphtha stream, such as a straight run naphtha which has been reformed over a platinum catalyst to increase its aromatic content. Ordinarily, the stream to the extractive distillation column will contain chiefly $C_7$ paraffins and aromatics with small contaminating amounts of $C_6$ and $C_8$ hydrocarbons. A suitable feed stock may have, for example, a boiling range of 155–275° F. and preferably a more limited range of say 180° F. to about 260° F. In the usual practice extending of the upper boiling limit to above about 250° F. leads to excessive loss of phenol in the overhead raffinate. The present process is not, however, limited in this respect and as a consequence a prefractionation to prepare the feed can be carried out for optimum toluene recovery. The prefractionated reformed naphtha streams generally have an aromatic content (almost exclusively toluene) approaching 50%. Some reformed streams may, however, contain toluene in appreciably lower amounts.

For xylene separation, the feed stock is preferably a reformed naphtha stream prefractionated to obtain a $C_8$ fraction of the boiling range extending from say 260° F. to approximately 315° F.

Referring to Fig. 1 a prefractionated reformed naphtha containing approximately 43% $C_7$ paraffins and around 48.5% toluene is passed via a line 10 to a lower section 11 of an extractive distillation column 12. The $C_7$ paraffins are mainly 2-methyl hexane, 3-methyl hexane and normal heptane. The stream also contains approximately 3% of $C_8$ paraffins and other minor amounts of cyclopentanes and cyclohexanes. The boiling range of this particular mixture extends from approximately 155° F. to 260° F. The feed stream is introduced either as a vapor or a liquid preferably at just below its boiling point. Phenol in a solvent: feed ratio of 3:1 enters the column adjacent the top of the extractive distillation zone through a line 14. The solvent to feed ratio may vary somewhat from the preceding but will generally be in the range of 2.5–5 parts of solvent to 1 part of feed on a volume basis. The heat needed for the operation of the column is supplied by a reboiler 16 and the tower is maintained at a conventional pressure of about 20 to 25 p.s.i.a. The descending solvent extracts the toluene from the feed stock and is removed in a solvent extract phase from the base of the tower via a line 17 and is passed to a conventional solvent stripper 18. The conditions of the stripper are conventional and the product toluene is withdrawn overhead from the stripper in a line 15 to a condenser 19 with the condensate toluene being collected in a receiver 20. A portion of the liquid toluene is returned as reflux to the top of the stripper in a line 21 and the rest of the liquid toluene is withdrawn as product via line 22. The heat necessary for the operation of the stripper is furnished by a reboiler 24. The stripped phenol solvent free of the toluene is returned to the extractive distillation column through the previous mentioned line 14.

The raffinate from the extractive distillation zone 11 of the column passes upwardly to the overlying rectification section or knock-back zone 26 which makes up the upper portion of the column. This zone is provided with several plates, for example, 10 or so, the actual number depending on the design factors, such as amount of reflux, volume of raffinate, relative volatility of the raffinate and phenol and other well known factors. The raffinate from the underlying extractive distillation zone of the column will contain some phenol and due to the presence of the azeotrope formers, the several plates of the rectification section are unable to separate completely the phenol from the raffinate. In order to achieve this separation, an Edeleanu extract solvent (characterized by a boiling range in excess of 90° F. of the boiling point of phenol and substantially free of paraffins and naphthenes) is introduced to an upper level of the rectification zone of the column through a line 28, preferably at a level which is a few trays removed from the top of the rectification zone. Thus, providing trays for rectifying the aromatic extract solvent out of the raffinate, forestalling its loss overhead in the raffinate stream. By introducing the aromatic solvent to this upper level of the zone, the liquid aromatic extract solvent will appear on each of the trays below the point of introduction, thus assuring a reduced volatility of the phenol relative to its normal azeotrope formers on each of the trays. Depending upon the conditions of the operation and the design of the extractive distillation zone it now becomes possible either to reduce significantly the phenol content of the raffinate or to forestall substantially the loss of any phenol in the raffinate. Phenol losses in the range of 0.2–0.7% based on the weight of the raffinate are commonly experienced in the absence of the use of the high boiling aromatic material in a conventional extractive distillation of toluene.

The raffinate now substantially free of phenol leaves the top of the rectification zone in a line 30, passing to a condenser 32 where the vapor is condensed, with the condensate being collected in a receiver 33. A portion of the condensate is returned to the top tray of the rectification zone as reflux via a line 34 and the rest of the raffinate is removed from the process via a line 36.

In the embodiment of the process illustrated in Fig. 1 in order to avoid possible overloading of the extractive distillation zone of the column and to obtain certain heat economies, the liquid collecting on a tray 13 in the lower section of the rectification zone is removed via a line 38 to a fractionation column 39 to accomplish separation of the alkyl benzene from the rest of the liquid. A reboiler 42 supplies the heat required for distilling overhead the non-Edeleanu solvent portion of the withdrawn stream, which overhead material is returned in a line 43 to the column at a point below the withdrawal tray. The high boiling aromatic solvent is returned to the top of the rectification zone in the line 28 from the bottom of the column 39. The high boiling aromatic solvent is introduced to the rectification zone in an amount of 0.1 to 1.0 volume per volume of the raffinate and preferably 0.3 volume per volume of the raffinate.

In the system illustrated in Fig. 2 a reformed naphtha feed enters a lower section 48 of an extractive distillation column 50 via a line 52. Phenol solvent for the extraction of the toluene is introduced to the top portion of the extractive distillation zone of the column through a line 53. The heat required for the operation of the column is supplied by a reboiler 54.

Raffinate from the extractive distillation zone 48 of the column passes upwardly into an overlying rectification or knock-back zone 56 which constitutes the upper portion of the column 50. This zone is provided with a number of plates. The raffinate from the underlying extractive distillation zone of the column contains some phenol due to the presence of the azeotrope formers of the feed. The several plates of the knock-back section are unable to separate the phenol from the raffinate through simple rectification and in order to achieve this separation a stream of a high boiling aromatic solvent (preferably, the Edeleanu extract solvent) is admitted to an upper level of the column via a line 57. The aromatic solvent enters the rectification zone at a few trays below the top of that zone for the reason mentioned in the description of Fig. 1. As mentioned before, the introduction of the high boiling aromatic solvent to the upper portion of the rectification zone assures presence of that material in the liquid of each succeeding lower tray, thereby reducing the volatility of the phenol relative to its normal azeotrope formers on each of the trays. In the process illustrated in Fig. 2 the high boiling aromatic solvent passes through the lower extractive distillation zone and is removed from the bottom of the column in the extract phase via a line 59 and is passed to a first fractionating zone 61 wherein the product toluene is stripped therefrom, leaving overhead in a line 63 which opens into a condenser 64. Condensate formed in this condenser collects in a receiver 65 with a portion of it being refluxed in line 66 to the top of the fractionating column and the rest removed as the toluene product in a line 67. The heat required for the operation of this fractionating column is supplied by a reboiler 69. A stream made up of the high boiling aromatic solvent and phenol solvent is continuously removed from the bottom of the fractionating tower 61 in a line 70 which opens into a central section of a second fractionating column 72. This column is operated to distill overhead the phenol solvent which leaves in a line 73 opening into a condenser 75. The liquid phenol from the condenser collects in a receiver 76 and from this latter vessel a reflux stream is returned in a line 78 to the top of the second fractionating column and the rest of the recovered phenol is returned in the previous mentioned line 53 to the extractive distillation column 50. A reboiler 80 supplies the heat needed for the operation of this second fractionating column. The high boiling aromatic solvent is recycled to the top section of the rectification zone of column 50 in the line 57 from the bottom of the column 72.

The raffinate substantially free of phenol is removed from the extractive distillation column via a line 83 to a condenser 84. The liquid raffinate from the condenser collects in a receiver 85, from which a portion is refluxed in a line 86 to the top tray of the extractive distillation column. The rest of the raffinate condensate from the receiver leaves in a line 87.

The system of Fig. 1 may be advantageously used where overloading of the extractive distillation zone would occur if all of the high boiling aromatic solvent should descend through it. Another advantage inherent in the process of Fig. 1 is a considerable heat economy over that required for the operation of the embodiment illustrated in Fig. 2. It will be noted in Fig. 2 that all of the phenol solvent is vaporized in its separation in the second fractionating column 72, whereas in the process of Fig. 1 the phenol solvent is removed as the bottom liquid of the stripper 18 and recycled without vaporization to the extractive distillation column. This is significant since phenol constitutes the largest stream of the process, and it is accordingly profitable if possible to avoid its vaporization. Another advantage of the process of Fig. 1 over that of Fig. 2 is that its practice need not significantly increase the solvent:feed ratio for the recovery of the toluene, whereas in the process of the other figure, it may be necessary to use increased volumes of the solvent because of the presence of the high boiling aromatic material in the extractive distillation zone and its removal with the extract phase.

The systems of Figs. 1 and 2 have been described with reference to the removal of toluene from a $C_7$ fraction. The two systems are adaptable to the recovery of xylenes from an appropriate $C_8$ fraction utilizing phenol as the extractive distillation solvent and the high boiling aromatic material as the volatility modifier for the overlying rectification zone.

I claim as my invention:

1. In an extractive distillation process employing phenol as the solvent introduced into the upper section of an extractive distillation zone above the feed entry, for the recovery of an aromatic material selected from the group consisting of toluene and xylene from a hydrocarbon feed containing a compound which azeotropes with phenol, thereby causing some of the phenol to pass overhead with raffinate, and wherein there is provided a rectification zone having a number of liquid carrying plates beyond the extractive distillation zone to further the separation of the solvent from the raffinate, the improvement which comprises introducing a liquid, high boiling aromatic hydrocarbon material into the upper level of the rectification zone causing it to pass into the liquid of the trays of the rectification zone and maintaining the high boiling aromatic hydrocarbon material in liquid phase thereon in an amount of 0.1 to 3.0 volumes per volume of raffinate, said amount sufficient to reduce significantly the loss of phenol in the raffinate thereby facilitating the separation of phenol and the raffinate, said high boiling aromatic hydrocarbon material having a boiling point at least 55° F. in excess of the boiling point of phenol and being further characterized by the inability to azeotrope with phenol, withdrawing overhead from the rectification zone a vapor phase hydrocarbon raffinate, said raffinate leaving the zone with a significantly reduced phenol content relative to that experienced in the absence of the high boiling aromatic hydrocarbon material, withdrawing the liquid collecting in the lower section of the rectification zone, separating the high boiling aromatic therefrom as distillation bottoms from the remainder of the withdrawn liquid as a distillation overhead, returning the distillation overhead to the extractive distillation zone and reintroducing the high boiling aromatic hydrocarbon bottoms into the upper level of the rectification zone.

2. An extractive distillation process in accordance with claim 1 wherein phenol is employed as the solvent for the recovery of toluene from a hydrocarbon feed containing a compound which azeotropes with phenol and wherein a high boiling aromatic hydrocarbon material is introduced into the upper level of the rectification zone in an amount of 0.1 to 1.0 volume of high boiling aromatic hydrocarbon per volume of raffinate and wherein the high boiling aromatic hydrocarbon is an aromatic solvent mixture prepared from the extract of a solvent extraction of an aromatic containing petroleum fraction and having an initial boiling point more than 90° F. above that of phenol and being substantially free of paraffins and naphthenes.

3. An extractive distillation process in accordance with claim 1 wherein phenol is employed as the solvent for the recovery of xylene from a hydrocarbon feed containing a compound which azeotropes with phenol and wherein a high boiling aromatic hydrocarbon material is introduced into the upper level of the rectification zone in an amount of 0.3 to 3.0 volumes of high boiling aromatic hydrocarbon per volume of raffinate and wherein the high boiling aromatic hydrocarbon is an aromatic solvent mixture prepared from the extract of a solvent extraction of an aromatic containing petroleum fraction and having an initial boiling point more than 90° F. above that of phenol and being substantially free of paraffins and naphthenes.

References Cited in the file of this patent

UNITED STATES PATENTS

| | | |
|---|---|---|
| 2,084,471 | Whiteley | June 22, 1937 |
| 2,406,695 | Lake | Aug. 27, 1946 |
| 2,520,006 | Hibshman et al. | Aug. 22, 1950 |